United States Patent [19]

Akiba

[11] Patent Number: 5,272,532
[45] Date of Patent: Dec. 21, 1993

[54] HORIZONTAL AFC (AUTOMATIC FREQUENCY CONTROL) CIRCUIT

[75] Inventor: Toshiya Akiba, Kanagawa, Japan

[73] Assignee: Sony Corporation, Japan

[21] Appl. No.: 967,203

[22] Filed: Oct. 27, 1992

[30] Foreign Application Priority Data

Nov. 1, 1991 [JP] Japan .................................. 3-313504

[51] Int. Cl.[5] ............................................. H04N 5/05
[52] U.S. Cl. ..................................... 358/158; 358/149; 358/155
[58] Field of Search ............... 358/149, 148, 158, 159, 358/153, 150, 337, 339, 320, 155

[56] References Cited

U.S. PATENT DOCUMENTS 3,334,182 8/1967 Legler .................................... 358/158

FOREIGN PATENT DOCUMENTS 0152277 7/1987 Japan .

Primary Examiner—James J. Groody
Assistant Examiner—David E. Harvey
Attorney, Agent, or Firm—Lewis H. Eslinger; Jay H. Maioli

[57] ABSTRACT

In a horizontal AFC circuit, a window output is produced from a window generating circuit 4 in response to an AFC output having a relatively long time constant, derived from a first AFC circuit 2. The window output is synchronously differentiated by an edge detecting circuit 5. Another AFC output having a relatively short time constant, derived from a second AFC circuit 3, is present within a window range under the normal condition. A horizontal oscillation output derived from an OR circuit 10 into which outputs from a DFF 8 and an AND circuit 7 are inputted, corresponds to the AFC output from the second AFC circuit 3. Also, when the AFC output of the second AFC circuit 3 is not present within the window range, the output from the OR circuit 10 corresponds to the edge outputs from the edge detecting circuit 5.

5 Claims, 5 Drawing Sheets

HORIZONTAL AFC (AUTOMATIC FREQUENCY CONTROL) CIRCUIT

BACKGROUND OF THE INVENTION

1. Field of the Invention

The present invention relates to a horizontal AFC (automatic frequency control) circuit employed in a TV (television) receiver.

2. Description of the Prior Art

There are possibilities that horizontal synchronization of a TV receiver is disturbed due to noise mixed into a picture (video) signal and a jitter occurring in a picture signal derived from a VTR and the like. Accordingly, in general, an automatic frequency control (AFC) is performed by a horizontal AFC circuit with respect to a horizontal synchronizing (sync) signal.

In the above-described conventional horizontal AFC circuit, both of the flow-up performance of the horizontal AFC circuit and the performance capable of eliminating adverse influences caused by the noise (antinoise characteristic) thereof can be hardly satisfied at the same time. A proper compromise should be made between these characteristics. As a consequence, the horizontal AFC circuit may not follow up the jitter caused by the VTR and the like, but also the TV picture may be scratched due to the noise.

SUMMARY OF THE INVENTION

Therefore, an object of the present invention is to provide a horizontal AFC circuit capable of satisfying the follow-up performance and antinoise characteristic thereof.

An AFC circuit, according to the present invention, is characterized by comprising:

a first AFC circuit 2 having a relatively long time constant, into which a horizontal synchronizing signal is supplied;

a window generating circuit 4 for generating an output having a predetermined width from an output of the first AFC circuit 2;

a second AFC circuit 3 having a relatively short time constant, into which the horizontal synchronizing signal is inputted, and for producing an output in a range of said predetermined width of the window generating circuit 4 when said horizontal synchronizing signal is under a normal condition;

an edge detecting circuit 5 for producing an edge output in accordance with an edge portion of the output having a predetermined width from the window generating circuit 4; and a horizontal oscillation output circuit 6 into which an output of the second AFC circuit 3 and an output of the edge detecting circuit 5, for outputting the output from the second AFC circuit 3 as the horizontal oscillation output when said output from the second AFC circuit 3 is within the range of the predetermined width, and for outputting the edge output when the output of the second AFC circuit 3 does not exceed the range of the predetermined width.

In the horizontal AFC circuit with the above-described arrangement, the first AFC circuit 2 produces the AFC output having a relatively long time constant, and the window generating circuit 4 produces the output having the predetermined width based upon this AFC output. The edge detecting circuit 5 synchronously differentiates the output having the predetermined width, and produces the edge output in accordance with the edge portion. Then, the second AFC circuit 3 produces the AFC output having a relatively short time constant which will be inputted into the horizontal oscillation output circuit 6 together with the above-described edge output. The horizontal oscillating output circuit 6 outputs as the horizontal oscillation output, the AFC output from the second AFC circuit present within the range of the output having a predetermined width, and also outputs as the horizontal oscillation output, the edge output when this AFC output is not present within the range of this output due to the jitter.

BRIEF DESCRIPTION OF THE DRAWINGS

The above-described aspects and other features of the present invention will now be explained in the following description, taken in connection with the accompanying drawings, in which.

DETAILED DESCRIPTION OF THE PREFERRED EMBODIMENTS

Figure 1:
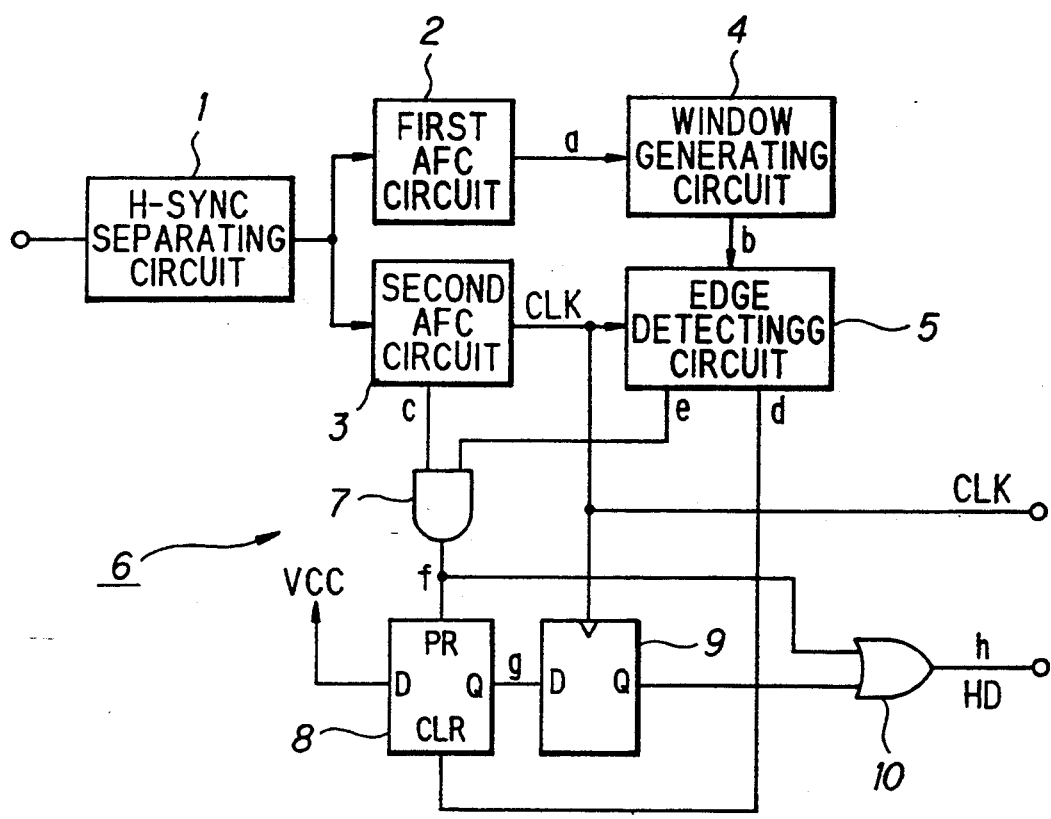
FIG. 1 is a circuit diagram for showing an arrangement of a horizontal AFC circuit according to a preferred embodiment of the present invention.

Referring now to the drawings, a preferred embodiment of the present invention will be described.

In a horizontal AFC circuit of FIG. 1, according to a preferred embodiment of the present invention, a picture (video) signal is inputted into a horizontal synchronization (sync) separating circuit 1 to separate a horizontal synchronizing (sync) signal from the picture signal. This horizontal sync signal is supplied to a first AFC circuit 2 constructed of a PLL (phase-locked loop) circuit having a relatively long time constant, and also to a second AFC circuit 3 constructed of a PLL circuit having a relatively short time constant. An AFC output "a" from the first AFC circuit 2 is inputted to a window generating circuit 4, so that an output "b" having a predetermined width (window) is produced from this AFC output "a". Also, both of a clock output CLK (910 $f_H$, symbol "$f_H$" denotes a horizontal frequency) of the second AFC circuit 3 and the output "b" of the window generating circuit 4 are inputted to an edge detecting circuit 5 in which the window output is synchronously differentiated to produce edge outputs "d" and "e" in accordance with the edge portions thereof. The respective outputs from the second AFC circuit 3 and the edge detecting circuit 5 are entered into a horizontal oscillation output circuit 6, whereby both of a horizontal oscillation output "h" and a clock CLK are obtained from this horizontal oscillation output circuit 6.

The horizontal oscillation output circuit 6 is arranged by an AND circuit 7, D flip-flops (will be refer to "DFF") 8, 9 and an OR circuit 10. The output "c" of the second AFC circuit 3 and also the output "e" of the edge detecting circuit 5 are inputted to the AND circuit 7, and the output "f" of the AND circuit 7 is inputted into a preset input "PR" of the DFF 8. Another output "d" from the edge detecting circuit 5 is inputted to a clear input CLR of the DFF 8. A Q-output "g" of this DFF 8 is supplied to a D input of the DFF 9. To the DFF 9, the clock DLK from the second AFC circuit 3 is inputted. Both of a Q-output of this DFF 9 and the output "f" of the AND circuit 7 are inputted to the OR circuit 10 from which a horizontal oscillation output (HD) "h" is obtained.

Figure 2:
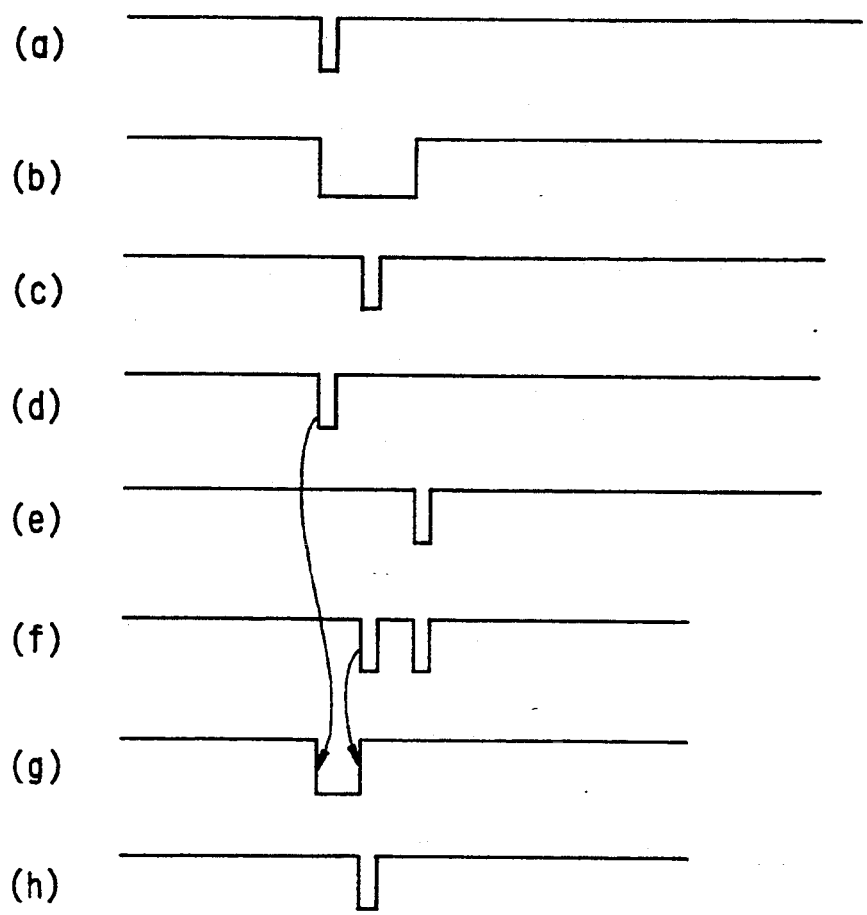
FIG. 2 shows a timing chart for representing waveforms of signals appearing in various circuit portions of the horizontal AFC circuit shown in FIG. 1 during a normal operation.

An operation of the horizontal AFC circuit with the above-described circuit arrangement will now be explained with reference to timing charts shown in FIGS. 2 to 4. First, a description will now be made of such a normal condition that no jitter occurs in a picture signal with reference to FIG. 2. The horizontal sync signal from the horizontal sync separating circuit 1 is inputted to the first AFC circuit 2, so that the AFC output "a" whose time constant is relatively long is produced as shown in FIG. 2a. This AFC output "a" is supplied to the window generating circuit 4, so that the output "b" having a predetermined width (window), as represented in FIG. 2b, is generated based on the AFC output "a." On the other hand, to the second AFC circuit 3, the horizontal sync signal derived from the horizontal sync separating circuit 1 is inputted in a similar manner to the first AFC circuit 2. Accordingly, the AFC output "c" whose time constant is relatively short is produced as shown in FIG. 2c. This AFC output "c" is positioned near a center of the width of the window output, and so controlled that the AFC output "c" is entered into a range of this width of the window output. Also, the window width is set in such a manner that this window width becomes the follow-up range of the output from the second AFC circuit 3 under the normal condition.

The edge detecting circuit 5 receives the output "b" from the window generating circuit 4, synchronously differentiates the output "b" in response to the clock CLK from the second AFC circuit 3, and produces a first edge output and a second edge output, which correspond to both edges of the window width, as represented in FIGS. 2d and 2e. Both of the output "c" from the second AFC circuit 3 and the second edge output "e" from the edge detecting circuit 5 are inputted to the AND circuit 7, whereby an output shown in FIG. 2f is produced and then is supplied to a PR input of the DFF 8. Then, the first edge output "d" of the edge detecting circuit 5 shown in FIG. 2d is supplied to the clear input "CLR" of the DFF 8, whereas an output "g" from the DFF 8 become such an output as shown in FIG. 2g, based on both of the output "d" and the output "f" of the AND circuit 7 in accordance with the output "c" of the second AFC circuit 3. This Q-output is supplied to a D-input of the DFF 9, and both of a Q-output of the DFF 9 and the output "f" of the AND circuit 7 are inputted to the OR circuit 10, so that the horizontal oscillation output "h" from the OR circuit 10 is obtained as represented in FIG. 2b. This output "h" is an in-phase state with the AFC output "c" from the second AFC circuit 3 shown in FIG. 2c.

Subsequently, referring now to FIG. 3, an operation of this horizontal AFC circuit under such a condition that the horizontal sync signal contained in the picture signal appears before the window width of the window generating circuit with regard to a lapse of time due to an occurrence of jitter. Under such a circumstance, as indicated in FIGS. 3b and 3c, since the output "c" of the second AFC circuit 3 is produced before the window width, the output "f" of the AND circuit 7 is outputted, as shown in FIG. 3f, in such that the output "f" corresponding to the output "c" from the second AFC circuit 3 appears before the first edge output "d" from the edge detecting circuit 5. As a consequence, after the output "f" has been applied to the PR input of the DFF 8, since the first edge output "d" is applied to the clear input "CLR" thereof, the Q-output "g" of the DFF 8 is produced as indicated in FIG. 3g, which depends upon both of the output "d" and the output "f" of the AND circuit 7 corresponding to the second edge output "e" of the edge detecting circuit 5. As a result, from the output "h" of the OR circuit 10, the edge detecting circuit 5 is produced as the horizontal oscillation output as indicated in FIG. 3h.

Next, a description will now be made of such a case that the horizontal sync signal contained in the picture signal appears after the window width of the window generating circuit 4 in a time lapse with reference to FIG. 4. Under such a condition, as indicated by FIGS. 4b and 4c, since the output "c" from the second AFC circuit 3 is produced after the window width, the output "f" of the AND circuit 7 is outputted as shown in FIG. 4f in such a manner that the output "f" according to the output "c" from the second AFC circuit 3 is derived after the second edge output "e" from the edge detecting circuit 5. As a consequence, after the first edge output "d" has been applied to the clear input CLR of the DFF 8, since the output "f" of the AND circuit 7 in accordance with the second edge output "e" is inputted to the PR input of this DFF 8, the Q-output "g" of the DFF 8 is produced as shown in FIG. 4g in such a manner that this output "g" depends upon both of the output "d" and also the output "f" from the AND circuit 7 corresponding to the second edge output "e". As a result, from the output "h" of the OR circuit 10, the edge output "e" of the edge detecting circuit 5 is produced as the horizontal oscillation output as indicated in FIG. 4h in a similar manner to FIG. 3h.

Figure 3:
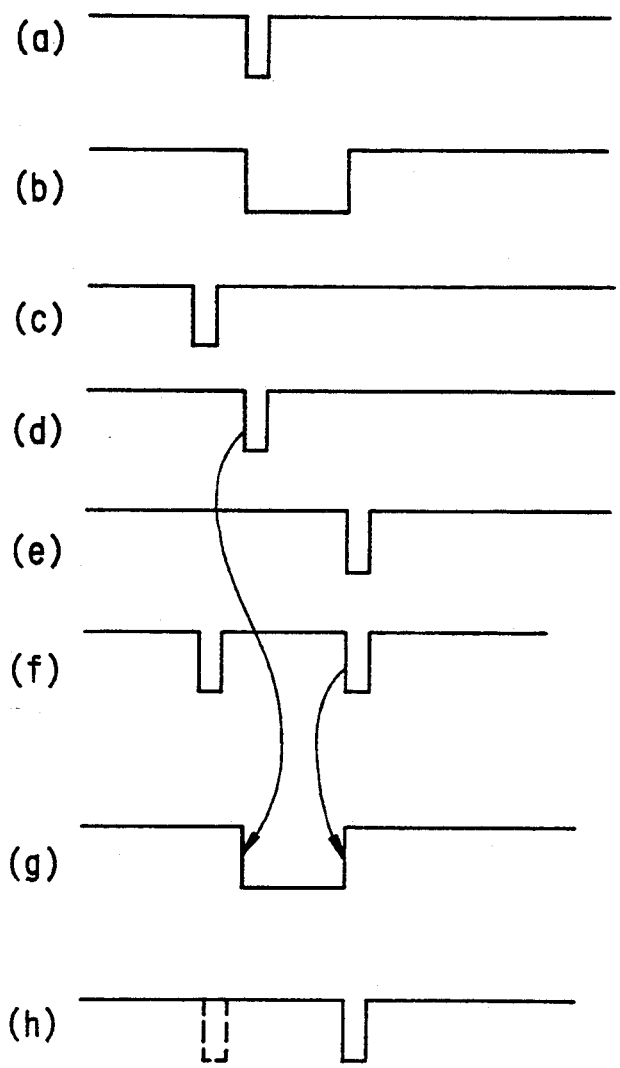
FIG. 3 indicates a timing chart for showing waveforms of signals appearing in the various circuit portions of the horizontal AFC circuit shown in FIG. 1 during a phase leading state.
Figure 4:
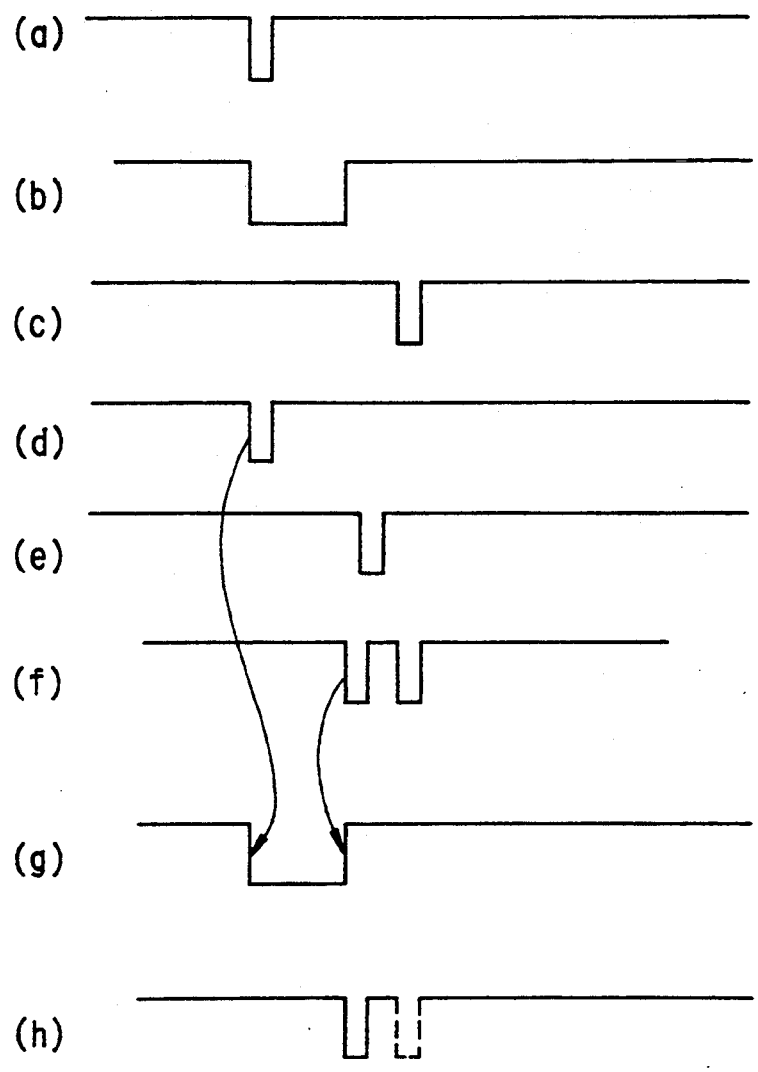
FIG. 4 shows a timing chart for indicating waveforms of signals appearing in the various portions represented in FIG. 1 during a phase delaying state.

As apparent from FIGS. 2 to 4, when the AFC output from the second AFC circuit 3 is present in the range of the window width obtained from the AFC output from the first AFC circuit 2, the AFC output from the second AFC circuit 3 having a relatively short time constant is outputted as the horizontal oscillation signal, so that a desirable follow-up characteristic can be achieved. Also, if the AFC output from the second AFC circuit 3 is not present within the range of the window width due to an occurrence of jitter, since the signal produced by synchronously differentiating this window width is outputted as the horizontal oscillation signal, the horizontal oscillation output corresponding to the AFC output from the first AFC circuit 2 having a relatively long time constant is obtained in case that the synchronization of the horizontal output is disturbed when a VTR is searched and noise happens to occur.

Figure 5:
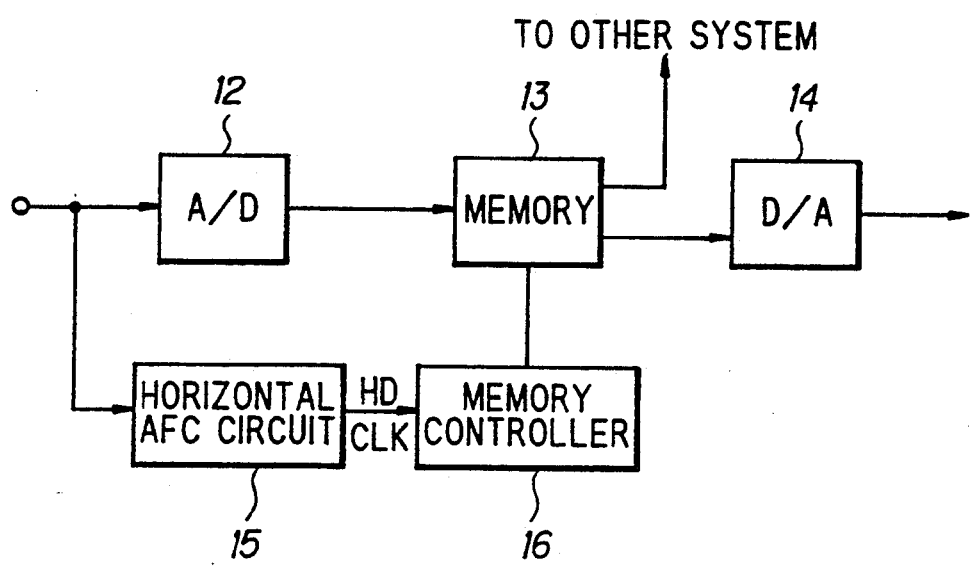
FIG. 5 is a schematic block diagram for showing an example of a circuit arrangement into which the horizontal AFC circuit has been assembled.

FIG. 5 represents an example of a circuit arrangement into which the horizontal AFC circuit shown in FIG. 2 has been assembled. A picture signal is A/D-converted by an A/D converter 12 into a digital picture signal. The digital picture signal is stored into a memory 13. The digital picture signal read out from this memory 13 is D/A-converted by a D/A converter 14 into an analog picture signal, and also is outputted to other system (not shown) for a further signal process. The picture signal is also inputted to a horizontal AFC circuit 15 of FIG. 15. Both of the horizontal oscillation output HD and the clock CLK obtained from this horizontal AFC circuit 15 are inputted into a memory controller 16. Based upon a control output of this memory controller 16, the writing/reading operations of the memory 13 are controlled.

With the above-described circuit arrangement, in response to the control signal derived from the memory controller 16, the data stored in the memory 13 is read out during the blanking period of the picture signal, and when the process for transferring the data of the memory 13 to other system is carried out, even if the horizontal synchronization is disturbed due to occurrences of noise and jitter during this blanking period, the normal time period can be maintained and no error operation is performed. This is because the horizontal oscillation signal "h" outputted from the horizontal AFC circuit 15 is produced from the AFC output having a relatively long time constant.

As previously described in detail, in accordance with the present invention, when the AFC output of the second AFC circuit is present within the range of the window width obtained from the AFC output of the first AFC circuit, the AFC output from the second AFC circuit having a relatively short time constant is outputted as the horizontal oscillation signal. Then, when the AFC output from the second AFC circuit is not present within this range of the window width, the signal obtained by synchronize-differentiating this window width is outputted as the horizontal oscillation signal. Accordingly, both of the AFC follow-up characteristic and the antinoise characteristic can be satisfied at the same time.

What is claimed is:

1. A horizontal AFC (automatic frequency control) circuit comprising:
    a first AFC circuit having a relatively long time constant, into which a horizontal synchronizing signal is supplied;
    a window generating circuit for generating an output having a predetermined width from an output of said first AFC circuit;
    a second AFC circuit having a relatively short time constant, into which the horizontal synchronizing signal is inputted, and for producing an output within a range of said predetermined width of the window generating circuit when said horizontal synchronizing signal is under a normal condition;
    an edge detecting circuit for producing edge outputs in accordance with edge portions of the output having a predetermined width from the window generating circuit; and
    a horizontal oscillation output circuit into which an output of the second AFC circuit and also an output of the edge detecting circuit, for outputting the output from the second AFC circuit as a horizontal oscillation output when said output from the second AFC circuit is present within the range of the predetermined width, and also for outputting the edge outputs when the output of the second AFC circuit is not present in the range of the predetermined width.

2. A horizontal AFC circuit as claimed in claim 1, wherein said edge detecting circuit synchronously differentiates said window output with a predetermined with from said window generating circuit, thereby producing said edge outputs corresponding to the edge portions of said window output.

3. A horizontal AFC circuit as claimed in claim 1, wherein said first AFC circuit is constructed of a PLL (phase-locked loop) circuit having a relatively long time constant, and said second AFC circuit is arranged by a PLL circuit having a relatively short time constant.

4. A horizontal AFC circuit as claimed in claim 1, wherein said horizontal oscillation output circuit is constructed of D-flip-flops, an AND gate circuit and an OR gate circuit.

5. A television receiver comprising at least:
    an A/D (analog-to-digital) converter for converting an analog picture signal into digital picture data;
    a memory unit for storing said digital picture data;
    a horizontal AFC circuit for automatically controlling a horizontal synchronizing signal contained in the analog picture signal to obtain a horizontal oscillation output and a clock signal; and
    a memory control unit for control reading/writing operations of said digital picture data into the memory unit in response to the horizontal oscillation output and the clock signal derived from the horizontal AFC circuit, said horizontal AFC circuit comprising:
    a first AFC circuit having a relatively long time constant, into which a horizontal synchronizing signal is supplied;
    a window generating circuit for generating an output having a predetermined width from an output of said first AFC circuit;
    a second AFC circuit having a relatively short time constant, into which the horizontal synchronizing signal is inputted, and for producing an output within a range of said predetermined width of the window generating circuit when said horizontal synchronizing signal is under a normal condition;
    an edge detecting circuit for producing edge outputs in accordance with edge portions of the output having a predetermined width from the window generating circuit; and
    a horizontal oscillation output circuit into which an output of the second AFC circuit and also an output of the edge detecting circuit, for outputting the output from the second AFC circuit as a horizontal oscillation output when said output from the second AFC circuit is present within the range of the predetermined width, and also for outputting the edge outputs when the output of the second AFC circuit is not present in the range of the predetermined width.

* * * * *